United States Patent
Spletzer et al.

(10) Patent No.: US 12,410,351 B2
(45) Date of Patent: Sep. 9, 2025

(54) REFRIGERANT COMPOSITIONS FOR REFRIGERANT COMPRESSOR SYSTEMS

(71) Applicant: THE CHEMOURS COMPANY FC, LLC, Wilmington, DE (US)

(72) Inventors: Stephen Spletzer, Lincoln University, PA (US); Barbara Haviland Minor, The Villages, FL (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 231 days.

(21) Appl. No.: 18/030,625

(22) PCT Filed: Oct. 7, 2021

(86) PCT No.: PCT/US2021/053969
§ 371 (c)(1),
(2) Date: Apr. 6, 2023

(87) PCT Pub. No.: WO2022/076684
PCT Pub. Date: Apr. 14, 2022

(65) Prior Publication Data
US 2023/0374361 A1 Nov. 23, 2023

Related U.S. Application Data

(60) Provisional application No. 63/138,928, filed on Jan. 19, 2021, provisional application No. 63/089,186, filed on Oct. 8, 2020.

(51) Int. Cl.
*C09K 5/04* (2006.01)

(52) U.S. Cl.
CPC ........ *C09K 5/045* (2013.01); *C09K 2205/122* (2013.01); *C09K 2205/126* (2013.01); *C09K 2205/40* (2013.01)

(58) Field of Classification Search
CPC ................ C09K 5/045; C09K 2205/12; C09K 2205/126; C09K 2205/40
See application file for complete search history.

(56) References Cited

U.S. PATENT DOCUMENTS

| 10,414,962 | B2 | 9/2019 | Saito et al. |
| 2008/0230738 | A1 | 9/2008 | Minor et al. |
| 2019/0062613 | A1* | 2/2019 | Saito ............... C10M 171/008 |
| 2022/0363967 | A1* | 11/2022 | Tækker Svendsen .. F25B 9/006 |

FOREIGN PATENT DOCUMENTS

GB 2435747 A * 9/2007 ............... C09K 3/30

OTHER PUBLICATIONS

ASHRAE Standard 34-2019, Designation and Safety Classification of Refrigerants, ANSI/ASHRAE, 2019, pp. 1-52, Atlanta, GA.
PCT International Search Report and Written Opinion for Application No. PCT/US2021/053969 mailed Jan. 28, 2022.
Standard Test Method for Concentration Limits of Flammability of Chemicals (Vapors and Gases), ASTM, 2015, E681-09, pp. 1 to 12, West Conshohocken, PA.

* cited by examiner

Primary Examiner — Elizabeth J Martin (57) ABSTRACT

Disclosed is a composition comprising difluoromethane (R-32), 2,3,3,3-tetrafluoropropene (R-1234yf), and isobutane (R-600a). A refrigeration system, including a hermetic compressor and a refrigerant composition. The refrigerant composition includes difluoromethane (R-32), 2,3,3,3-tetrafluoropropene (R-1234yf), and isobutane (R-600a).

18 Claims, 2 Drawing Sheets

REFRIGERANT COMPOSITIONS FOR REFRIGERANT COMPRESSOR SYSTEMS

FIELD

The present invention is directed to refrigerant compositions for refrigerant compressors in vapor compression systems.

BACKGROUND

Refrigerants with very low global warming potential (GWP<150) are needed to meet regulatory requirements for various applications and market segments. Several alternatives have been developed, to replace conventional high GWP refrigerants, such as R-404A. Many of the low GWP refrigerants suggested for this replacement, such as R-457A, exhibit higher discharge temperatures than the high GWP refrigerants, such as R 404A which they replace. This can limit their effectiveness by reducing a compressor's operating envelope in a vapor compression system. This can be particularly critical for hermetic compressors, used in low or medium temperature refrigeration, as many of these models do not employ an active discharge temperature control system, such as liquid or vapor injection. Left unchecked, the higher discharge temperatures generated in these applications could potentially reduce compressor longevity. Without the ability to actively mitigate discharge temperatures, use of these compressors may be limited to applications with higher evaporator temperatures and/or lower condensing temperatures.

SUMMARY

In an exemplary embodiment, a composition comprising a refrigerant composition. The refrigerant composition includes difluoromethane (R-32), 2,3,3,3-tetrafluoropropene (R-1234yf), and isobutane (R-600a).

In another exemplary embodiment, a refrigeration system including a hermetic compressor and a refrigerant composition. The refrigerant composition includes difluoromethane (R-32), 2,3,3,3-tetrafluoropropene (R-1234yf), and isobutane (R-600a).

In another exemplary embodiment, a method of replacing a first refrigerant composition comprising R-404A, R-457A, R-290, R-454C, or 507A with a second refrigerant composition comprising 70 to 84 weight percent 2,3,3,3-tetrafluoropropene, 15 weight percent to 22 weight percent difluoromethane, and 1.0 to 10 weight percent isobutane. The replacing is performed in a refrigeration system including a hermetic compressor.

In another exemplary embodiment, a method of operating a hermetic compressor as part of a refrigeration system. The method includes the steps of receiving by a hermetic compressor a refrigerant composition including difluoromethane (R-32), 2,3,3,3-tetrafluoropropene (R-1234yf), and isobutane, and compressing by hermetic compressor the refrigerant composition. The discharge temperature of the compressor is between 78.0° C. and 102.0° C.

Other features and advantages of the present invention will be apparent from the following more detailed description of the preferred embodiment which illustrates, by way of example, the principles of the invention.

DETAILED DESCRIPTION

Definitions

A refrigerant is defined as a heat transfer fluid that undergoes a phase change from liquid to gas and back again during a cycle used to transfer of heat.

A refrigeration system is the system (or apparatus) used to produce a heating or cooling effect in a particular space. A heat transfer or refrigeration system may be a mobile system or a stationary system.

Examples of refrigeration systems are any type of refrigeration systems and air conditioning systems including, but are not limited to, stationary heat transfer systems, air conditioners, freezers, refrigerators, heat pumps, water chillers, flooded evaporator chillers, direct expansion chillers, walk-in coolers, mobile or transport refrigeration systems, mobile heat transfer systems, mobile air conditioning units, dehumidifiers, and combinations thereof.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

The net refrigeration effect is the quantity of heat that each kilogram of refrigerant absorbs in the evaporator to produce useful cooling.

The mass flow rate is the quantity of refrigerant in kilograms circulating through the refrigeration, heat pump or air conditioning system over a given period of time.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions. Determination of whether a refrigerant compound or mixture is flammable or non-flammable is also done by testing under the conditions of ASTM-E681.

During a refrigerant leak, lower boiling components of a mixture may leak preferentially. Thus, the composition in the system, as well as, the vapor leaking can vary over the time period of the leak. Thus, a non-flammable mixture may become flammable under leakage scenarios. And in order to be classified as non-flammable by ASHRAE (American Society of Heating, Refrigeration and Air-conditioning Engineers), a refrigerant or heat transfer composition must be non-flammable as formulated, but also under leakage conditions. ASHRAE defines different flammability classifications. Class 1 refrigerants do not propagate a flame. Class 3 refrigerants have higher flammability and Class 2 refrigerants are called flammable. Class 2L refrigerants are lower flammability, with a burning velocity≤10 cm/sec.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine or other ozone depleting halogens.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause, other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do not materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb).

Difluoromethane (HFC-32 or R-32) is commercially available or may be made by methods known in the art, such as by dechlorofluorination of methylene chloride.

Isobutane (R-600a) is commercially available from many gas supply houses or may be produced by any of numerous well-known methods.

Compositions and Systems

Provided are low global warming potential (GWP) refrigerant compositions exhibiting low discharge temperatures and high heat capacity. The refrigerant compositions are suitable for use in hermetic compressors, used in refrigeration applications.

In another embodiment, provided are refrigeration systems comprising hermetic compressors.

Figure 1:
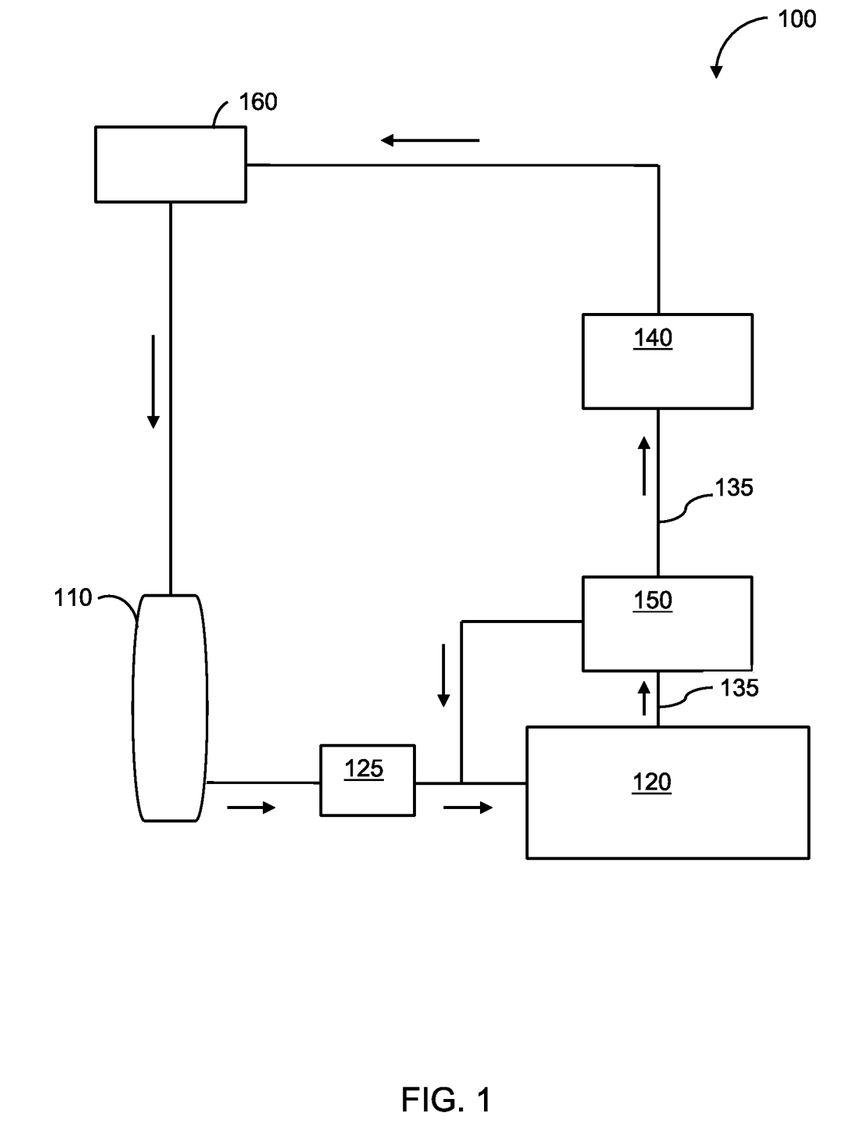
FIG. 1 is a schematic diagram of a refrigeration system, according to an embodiment.

An embodiment of a refrigeration system 100 is shown in FIG. 1. In the embodiment of FIG. 1 the refrigeration system 100 includes a receiving tank 110. The receiving tank 110 contains a refrigerant composition and supplies the refrigerant composition to the other components of the refrigeration system 100 during operation.

The refrigerant composition may be selected from materials having a low global warming potential (GWP). In some embodiments, the refrigerant composition exhibits a GWP of less than 180, less than 150, and/or less than 130. In some embodiments, the refrigerant composition may be selected to replace a refrigerant composition having a high GWP. In some embodiments, the refrigerant composition may be selected to replace refrigerant compositions such as R-404A, R-290, R-454C, R-457A, and R-507A. Replacement compositions desirably provide similar or improved properties to as compared to R-404A. Similar properties may include flammability, discharge temperature, and heat transport capacity.

Suitable refrigerant compositions for the replacement of R-404A refrigerants may include difluoromethane (R-32), 2,3,3,3-tetrafluoropropene (R-1234yf), and isobutane (R-600a). In some embodiments, the refrigerant composition may be a non-azeotropic refrigerant composition.

In an embodiment, the refrigeration system 100 may be a direct expansion refrigeration system. During operation of the refrigeration system 100, the refrigerant composition circulates throughout the refrigeration system 100 as part of the heat transfer processes. In the example of FIG. 1, the receiving tank 110 is operably coupled to an evaporator 120 via an expansion device 125 such as an orifice tube, capillary tube, thermal expansion valve or electronic expansion valve. The expansion device 125, supplies the refrigerant composition to the evaporator 120. In some embodiments, the receiving tank 110 is optional. In such embodiments, the refrigerant is provided directly to the evaporator 120 without a receiver. In an embodiment, the refrigerant composition is transported between the receiving tank 110 and evaporator 120 via the expansion device 125. In some embodiments, the evaporator 120 may be operated in a low temperature mode. For the purposes described herein low temperature evaporator operation is between −40° C. and −18° C. In some embodiments, the evaporator 120 may be operated in a medium temperature mode. For the purposes described herein medium temperature evaporator operation is between −20° C. and −5° C.

The evaporator 120 is operably connected to a compressor 140 via a suction line 135. The compressor 140 increases the pressure of the vaporous refrigerant entering the compressor 140. In some embodiments, the compressor 140 may be a hermetic compressor. In some embodiments, the hermetic compressor is a rotary compressor, scroll compressor, or a reciprocating compressor. In some embodiments, the hermetic compressor is a low back pressure (LBP) hermetic compressor. In some embodiments, the hermetic compressor is a medium back pressure (MBP) hermetic compressor. In another embodiment, the hermetic compressor is a low back pressure (LBP) reciprocating compressor.

In an embodiment, the refrigerant composition is a non-azeotropic composition including difluoromethane (R-32), 2,3,3,3-tetrafluoropropene (R-1234yf), and isobutane (R-600a). In some embodiments, the discharge temperature of the hermetic compressor is between 78.0° C. and 102.0° C., between 80.0° C. and 100.0° C., between 81° C. and 99.0° C., between 81° C. and 97.0° C., between 81.0° C. and 85.0° C., between 90° C. and 97.0° C. and combinations thereof.

The compressor 140 is operably connected to a condenser 160. The condenser 160 receives the pressurized vapor refrigerant and allows the pressurized vapor evaporator to transfer heat to an external medium and condense to the liquid state.

The condenser 160 is operably connected to the receiving tank 110. The liquid refrigerant returns to the receiving tank 110 and is again available to absorb heat by again being provided to the evaporator 120.

In compositions intended to replace conventional high GWP refrigerant, it is desirable that the replacement refrigerant composition exhibit a low GWP as well as similar or improved refrigerant properties compared to the refrigerant it is replacing. In some embodiments, the refrigerant composition is intended to replace R-457A (a mixture containing 18 weight percent HFC-32, 70 weight percent HFO-1234yf, and 12 weight percent HFC-152a (1,1-difluoroethane), R-454C (a mixture containing 21.5 weight percent HFC-32 and 78.5 weight percent HFO-1234yf), R-404A (a mixture of 44 weight percent HFC-125 (pentafluoroethane), 52 weight percent HFC-143a (1,1,1-trifluoroethane), and 4 weight percent HFC-134a (1,1,1,2-tetrafluoroethane)), R-507A (a mixture containing 50 weight percent HFC-125 and 50 weight percent HFC-143a), or R-290 (propane).

In some embodiments, the refrigerant composition includes difluoromethane (R-32) in an amount of 15 to 22 weight percent based on the weight of the refrigerant composition, 2,3,3,3-tetrafluoropropene (R-1234yf) in an amount of 70 to 84 weight percent based on the weight of the refrigerant composition, and isobutane (R-600a) in an amount of 1.0 to 10 weight percent based on the weight of the refrigerant composition. In some embodiments, the refrigerant composition includes difluoromethane (R-32) in an amount of 15 to 21.5 weight percent based on the weight of the refrigerant composition, 2,3,3,3-tetrafluoropropene (R-1234yf) in an amount of 70 to 84 weight percent based on the weight of the refrigerant composition, and isobutane (R-600a) in an amount of 1.0 to 10 weight percent based on the weight of the refrigerant composition. In some embodiments, the refrigerant composition includes difluoromethane (R-32) in an amount of 15 to 21 weight percent based on the weight of the refrigerant composition, 2,3,3,3-tetrafluoropropene (R-1234yf) in an amount of 70 to 84 weight percent based on the weight of the refrigerant composition, and isobutane (R-600a) in an amount of 1.0 to 10 weight percent based on the weight of the refrigerant composition. In some embodiments, the refrigerant composition includes difluoromethane (R-32) in an amount of 15 to 20 weight percent based on the weight of the refrigerant composition, 2,3,3,3-tetrafluoropropene (R-1234yf) in an amount of 70 to 84 weight percent based on the weight of the refrigerant composition, and isobutane (R-600a) in an amount of 1.0 to 10 weight percent based on the weight of the refrigerant composition. In an embodiment, the refrigerant composition includes difluoromethane (R-32) in an amount of 15 to 19 weight percent based on the weight of the refrigerant composition, 2,3,3,3-tetrafluoropropene (R-1234yf) in an amount of 76 to 84 weight percent based on the weight of the refrigerant composition, and isobutane (R-600a) in an amount of 1.0 to 6.0 weight percent based on the weight of the refrigerant composition. In another embodiment, the refrigerant composition includes difluoromethane (R-32) in an amount of 16 to 18 weight percent based on the weight of the refrigerant composition, 2,3,3,3-tetrafluoropropene (R-1234yf) in an amount of 78 to 83 weight percent based on the weight of the refrigerant composition, and isobutane (R-600a) in an amount of 1.0 to 4.0 weight percent or alternatively, 2.0 to 6.0 weight percent based on the weight of the refrigerant composition. In another embodiment, the refrigerant composition includes difluoromethane (R-32) in an amount of 17 to 18 weight percent based on the weight of the refrigerant composition, 2,3,3,3-tetrafluoropropene (R-1234yf) in an amount of 78 to 81 weight percent based on the weight of the refrigerant composition, and isobutane (R-600a) in an amount of 1.0 to 4.0 weight percent or alternatively, 3.0 to 5.0 weight percent based on the weight of the refrigerant composition.

In one embodiment of the refrigerant composition the isobutane is present in an amount from about 1.0 to about 3.3 weight percent. In another embodiment, the isobutane is present in an amount from about 2.0 to 3.3 weight percent.

In one embodiment, the refrigerant composition includes difluoromethane (R-32) in an amount of 18 weight percent based on the weight of the refrigerant composition, 2,3,3,3-tetrafluoropropene (R-1234yf) in an amount of 78 weight percent based on the weight of the refrigerant composition, and isobutane (R-600a) in an amount of 4.0 weight percent based on the weight of the refrigerant composition. In one other embodiment, the refrigerant composition includes difluoromethane (R-32) in an amount of 18 weight percent based on the weight of the refrigerant composition, 2,3,3,3-tetrafluoropropene (R-1234yf) in an amount of 79 weight percent based on the weight of the refrigerant composition, and isobutane (R-600a) in an amount of 3.0 weight percent based on the weight of the refrigerant composition. In one other embodiment, the refrigerant composition includes difluoromethane (R-32) in an amount of 18 weight percent based on the weight of the refrigerant composition, 2,3,3,3-tetrafluoropropene (R-1234yf) in an amount of 80 weight percent based on the weight of the refrigerant composition, and isobutane (R-600a) in an amount of 2.0 weight percent based on the weight of the refrigerant composition. In one other embodiment, the refrigerant composition includes difluoromethane (R-32) in an amount of 18 weight percent based on the weight of the refrigerant composition, 2,3,3,3-tetrafluoropropene (R-1234yf) in an amount of 81 weight percent based on the weight of the refrigerant composition, and isobutane (R-600a) in an amount of 1.0 weight percent based on the weight of the refrigerant composition.

In particular, any of the compositions in Table A may be used in the refrigeration system comprising a hermetic compressor.

TABLE A

| HFC-32 | HFO-1234yf | Isobutane |
|---|---|---|
| 18 | 72 | 10 |
| 18 | 73 | 9 |
| 18 | 74 | 8.0 |
| 18 | 75 | 7.0 |
| 18 | 76 | 6.0 |
| 18 | 77 | 5.0 |
| 18 | 78 | 4.0 |
| 18 | 79 | 3.0 |
| 18 | 80 | 2.0 |

TABLE A-continued

| HFC-32 | HFO-1234yf | Isobutane |
|---|---|---|
| 18 | 81 | 1.0 |
| 20 | 75 | 5.0 |
| 19 | 76 | 5.0 |
| 18 | 77 | 5.0 |
| 17 | 78 | 5.0 |
| 16 | 79 | 5.0 |
| 15 | 80 | 5.0 |
| 21.5 | 73.5 | 5.0 |
| 21 | 74 | 5.0 |
| 20.5 | 74.5 | 5.0 |
| 21.5 | 73.6 | 4.9 |
| 21.5 | 73.7 | 4.8 |
| 21.5 | 73.8 | 4.7 |
| 21.5 | 73.9 | 4.6 |
| 21.5 | 74.0 | 4.5 |
| 21.5 | 74.1 | 4.4 |
| 21.5 | 74.2 | 4.3 |
| 21.5 | 74.3 | 4.2 |
| 21.5 | 74.4 | 4.1 |
| 21.5 | 74.5 | 4.0 |

The refrigerant compositions may further comprise one or more optional non-refrigerant components selected from the group consisting of lubricants, dyes (including UV dyes), solubilizing agents, compatibilizers, stabilizers, tracers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. In some embodiments, the optional non-refrigerant components may be referred to as additives. Indeed, many of these optional non-refrigerant components fit into one or more of these categories and may have qualities that lend themselves to achieve one or more performance characteristic.

In order to facilitate the operation and extend the service life of the compressor 140 a lubricant may be included in the refrigerant composition. Solubility and miscibility of the lubricant with the refrigerant composition may improve the performance of the lubricant and extend the service life of the compressor 140. In some embodiments, the lubricant may include mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof. In certain embodiments, the lubricant includes a polyol ester or a polyvinyl ether. In one embodiment, the lubricant includes a polyol ester. In another embodiment, the lubricant includes a polyvinyl ether.

An optional non-refrigerant component used with the refrigerant compositions may be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of butylated hydroxytoluene (BHT); tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl) phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad©620; isopropylated triphenyl phosphates such as those commercially available under the trademarks Durad® 220 and Durad®110; anisole; 1,4-dimethoxybenzene; 1,4-diethoxybenzene; 1,3,5-trimethoxybenzene; myrcene, alloocimene, limonene (in particular, d-limonene); retinal; pinene (α or β forms); menthol; geraniol; farnesol; farnesene (α or β forms); phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)isobutane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

In particular, the optional non-refrigerant component can be a polymerization inhibitor. Polymerization inhibitors can include terpenes or terpenoids, butylated triphenylphosphorothionates, benzophenone and derivatives thereof, terephthalates, phenols, epoxides and combinations of any of these classes. Polymerization inhibitors may include, but are not limited to myrcene, alloocimene, limonene (in particular, d-limonene); retinal; pinene (α or β forms); menthol; geraniol; farnesol; farnesene (α or β forms); phytol; Vitamin A; terpinene (α or γ forms); delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane, butylated triphenylphosphorothionate (sold by Ciba under the trademark Irgalube® 232), divinyl terephthalate, diphenylterephthalate, butylatedhydroxy toluene (BHT), tocopherol, hydroquinone, 1,2-propylene oxide, 1,2-butylene oxide, butylphenylglycidy ether, pentylphenylglycidyl ether, hexylphenylglycidyl ether, heptylphenylglycidyl ether, octylphenylglycidyl ether, nonylphenylglycidyl ether, decylphenylglycidyl ether, glycidyl methylphenylether, 1,4-glycidyl phenyl diether, 4-methoxyphenylglycidyl ether, naphthyl glycidyl ether, 1,4-diglycidyl naphthyl diether, butylphenyl glycidyl ether, n-butyl glycidyl ether, isobutyl glycidyl ether, hexanediol diglycidyl ether, allyl glycidyl ether, polypropylene glycol diglycidyl ether, trifluoromethyloxirane, 1,1-bis(trifluoromethyl)oxirane, and combinations thereof.

The optional non-refrigerant component which is used with compositions of the present invention may alternatively be a tracer. The tracer may be a single compound or two or more tracer compounds from the same class of compounds or from different classes of compounds. In some embodiments, the tracer is present in the compositions at a total concentration of about 1 part per million by weight (ppm) to about 5000 ppm, based on the weight of the total composition. In other embodiments, the tracer is present at a total concentration of about 10 ppm to about 1000 ppm. In other embodiments, the tracer is present at a total concentration of about 20 ppm to about 500 ppm. In other embodiments, the tracer is present at a total concentration of about 25 ppm to about 500 ppm. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, chlorofluororcarbons (CFCs), hydrofluorochlorocarbons (HCFCs), hydrofluoroolefins (HFOs), chlorocarbons, perfluorocarbons, fluoroethers, brominated compounds, iodated compounds, alcohols, aldehydes and ketones, nitrous oxide and combinations thereof. Alternatively, the tracer may be selected from the group consisting of trifluoromethane (HFC-23), 1,1,1,3-tetrafluoropropene (HFO-1234ze, cis or trans), 3,3,3-trifluoropropene (HFO-1243zf), 1,2,3,3,3-pentafluoropropene (HFO-1225ye, E or Z isomer), dichlorodifluoromethane (CFC-12), chlorodifluoromethane HCFC-22), methyl chloride (R-40), chlorofluoromethane (HCFC-31), fluoroethane (HFC-161), 1,1,1-trifluoroethane (HFC-143a), chloropentafluoroethane (CFC-115), 1,2-dichloro-1,1,2,2-tetrafluoroethane (CFC-114), 1,1-dichloro-1,2,2,2-tetrafluoroethane (CFC-114a), 2-chloro-1,1,1,2-tetrafluoroethane (HCFC-124), pentafluoroethane (HFC-125), 1,1,2,2-tetrafluoroethane (HFC-134), 1,1,1,2-tetrafluoroethane (HFC-134a), 1,1,1,3,3,3-hexafluoropropane (HFC-236fa), 1,1,1,2,3,3,3-heptafluoropropane (HFC-227ea), 1,1,1,2,2,3,3-heptafluoropropane (HFC-227ea), 1,1,1,3,3-pentafluoropropane(HFC-245fa), 1,1,1,2,2-pentafluoropropane (HFC-245cb), 1,1,1,2,3-pentafluoropropane (HFC-245eb), 1,1,2,2-tetrafluoropropane (HFC-254cb), 1,1,1,2-tetrafluoropropane (HFC-254eb), 1,1,1-trifluoropropane (HFC-263fb), 1,1-difluoro-2-chloroethylene (HCFC-1122), 2-chloro-1,1,2-trifluoroethylene (CFC-1113), 1,1,1,3,3-pentafluorobutane (HFC-365mfc), 1,1,1,2,3,4,4,5,5,5-decafluoropentane (HFC-43-10mee), 1,1,1,2,2,3,4,5,5,6,6,7,7,7-tetradecafluoroheptane, hexafluorobutadiene, 3,3,3-trifluoropropyne, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer is a blend containing two or more hydrofluorocarbons, or one hydrofluorocarbon in combination with one or more perfluorocarbons. In other embodiments, the tracer is a blend of at least one CFC and at least one HCFC, HFC, or PFC.

The tracer may be added to the compositions of the present invention in predetermined quantities to allow detection of any dilution, contamination or other alteration of the composition. Additionally, the tracers may allow detection of product that infringes existing patent rights, by identification of the patent owner's product versus competitive infringing product. Further, in one embodiment, the tracer compounds may allow detection of a manufacturing process by which a product is produced.

In some embodiments, an optional surge tank or accumulator 150 may be inserted between the evaporator 120 and compressor 140 to prevent liquid refrigerant and/or lubricant from entering the compressor 140. The surge tank 150, if present, may return any accumulated liquids to the evaporator 120.

Figure 2:
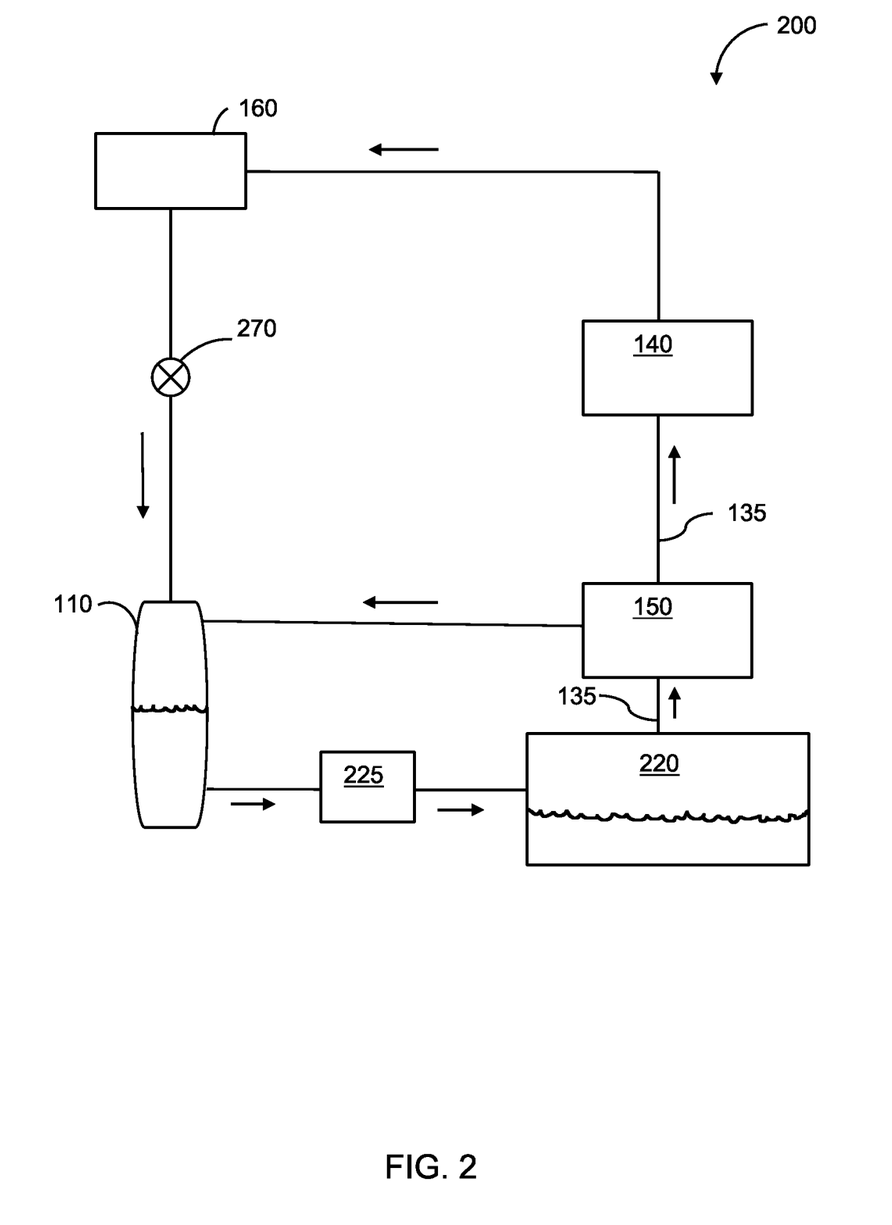
FIG. 2 is a schematic diagram of a refrigeration system, according to an embodiment.

In an alternate embodiment, the refrigeration system may be a flooded evaporator refrigeration system 200. FIG. 2 illustrates a flooded evaporator refrigeration system 200. In the example of FIG. 2, the elements of the system are the same as described above for the direct expansion refrigeration system 100 except that the capillary tube 125 is not present and an optional pump 225 may be present to assist the transfer of refrigerant from the receiving tank 110 to a flooded evaporator 220. The surge tank 150, if present, may return any accumulated liquids to the receiving tank 110 to again be provided to the evaporator 220. The operable connection from the condenser 160 to the receiving tank 110 further includes an expansion valve 270.

The performance of the inventive refrigerant compositions, as compared to R-457A, R-454C, R-404A and other refrigerants is presented in Tables 1 to 6 below.

EXAMPLES

Example 1

Refrigeration Performance

Refrigeration performance of compositions of the present invention were compared to R-404A (a mixture of 44 weight percent HFC-125 (pentafluoroethane), 52 weight percent HFC-143a (1,1,1-trifluoroethane), and 4 weight percent HFC-134a (1,1,1,2-tetrafluoroethane)), R-290 (propane), R-454C (a mixture containing 21.5 weight percent HFC-32 and 78.5 weight percent HFO-1234yf), R-457A (a mixture containing 18 weight percent HFC-32, 70 weight percent HFO-1234yf, and 12 weight percent HFC-152a (1,1-difluoroethane), and R-507A (a mixture containing 50 weight percent HFC-125 and 50 weight percent HFC-143a). Performance was determined at both low and medium temperature refrigeration conditions.

TABLE 1

PROPERTIES OF CONVENTIONAL REFRIGERANTS -
LOW TEMPERATURE REFRIGERATION
(40° C. Avg. Condenser, −35° C. Avg.
Evaporator, −15° C. Return gas temperature,
0.7 Compressor Efficiency, 0.1 m3/min Compressor
Displacement, 1 ton of refrigeration)

| ASHRAE # | TDIS (° C.) | Δ TDIS Rel. to R-404A (° C.) | Capacity (kJ/m3) | Capacity Rel. to R-404A (%) | COP | Mass Flow (kg/min) | GWP 100 Year (AR4) |
|---|---|---|---|---|---|---|---|
| R-404A | 88.9 | 0.0 | 813.4 | 100.0 | 1.338 | 2.046 | 3,922 |
| R-290 | 95.9 | 7.0 | 752.6 | 92.5 | 1.510 | 0.822 | 3 |
| R-454C | 99.4 | 10.5 | 720.9 | 88.6 | 1.431 | 1.632 | 146 |
| R-457A | 102.0 | 13.1 | 664.9 | 81.7 | 1.465 | 1.500 | 139 |
| R-507A | 87.6 | −1.3 | 832.7 | 102.4 | 1.325 | 2.118 | 3,985 |

TABLE 2

PROPERTIES OF CONVENTIONAL REFRIGERANTS -
MEDIUM TEMPERATURE REFRIGERATION
(40° C. Avg. Condenser, −7° C. Avg.
Evaporator, 18° C. Return gas temperature,
0.7 Compressor Efficiency, 0.1 m³/min Compressor
Displacement, 1 ton of refrigeration)

| ASHRAE # | $T_{DIS}$ (° C.) | Δ $T_{DIS}$ Rel. to R-404A (° C.) | Capacity (kJ/m³) | Capacity Rel. to R-404A (%) | COP | Mass Flow (kg/min) | GWP 100 Year (AR4) |
|---|---|---|---|---|---|---|---|
| R-404A | 79.5 | 0.0 | 2684.4 | 100.0 | 2.882 | 1.674 | 3,922 |
| R-290 | 82.7 | 3.2 | 2254.0 | 84.0 | 3.116 | 0.696 | 3 |

TABLE 2-continued

PROPERTIES OF CONVENTIONAL REFRIGERANTS -
MEDIUM TEMPERATURE REFRIGERATION
(40° C. Avg. Condenser, −7° C. Avg.
Evaporator, 18° C. Return gas temperature,
0.7 Compressor Efficiency, 0.1 m³/min Compressor
Displacement, 1 ton of refrigeration)

| ASHRAE # | $T_{DIS}$ (° C.) | Δ $T_{DIS}$ Rel. to R-404A (° C.) | Capacity (kJ/m³) | Capacity Rel. to R-404A (%) | COP | Mass Flow (kg/min) | GWP 100 Year (AR4) |
|---|---|---|---|---|---|---|---|
| R-454C | 85.2 | 5.7 | 2429.3 | 90.5 | 2.999 | 1.380 | 146 |
| R-457A | 86.5 | 7.0 | 2247.6 | 83.7 | 3.045 | 1.284 | 139 |
| R-507A | 78.8 | −0.7 | 2737.4 | 102.0 | 2.865 | 1.728 | 3,985 |

TABLE 3

R-32/R-1234YF/R-600A COMPOSITIONS -
LOW TEMPERATURE REFRIGERATION
(40° C. Avg. Condenser, −35° C. Avg. Evaporator, −15° C.
Return gas temperature, 0.7 Compressor Efficiency, 0.1 m³/min
Compressor Displacement, 1 ton of refrigeration)

| R-32/R-1234yf/R-600a (weight %) | $T_{DIS}$ (° C.) | Capacity (kJ/m³) | COP | Mass Flow (kg/min) | GWP 100 Year (AR4) |
|---|---|---|---|---|---|
| 18/72/10 | 94.2 | 681.4 | 1.420 | 1.596 | 125 |
| 18/73/9 | 94.3 | 681.9 | 1.420 | 1.602 | 125 |
| 18/74/8 | 94.5 | 682.2 | 1.420 | 1.614 | 125 |
| 18/75/7 | 94.6 | 682.3 | 1.420 | 1.626 | 125 |
| 18/76/6 | 94.8 | 682.0 | 1.421 | 1.632 | 125 |
| 18/77/5 | 95.0 | 681.6 | 1.422 | 1.644 | 125 |
| 18/78/4 | 95.2 | 680.9 | 1.423 | 1.650 | 125 |
| 18/79/3 | 95.5 | 679.9 | 1.424 | 1.662 | 125 |
| 18/80/2 | 95.7 | 678.8 | 1.426 | 1.668 | 125 |
| 18/81/1 | 95.9 | 677.4 | 1.427 | 1.674 | 125 |
| 20/75/5 | 96.7 | 707.4 | 1.423 | 1.614 | 138 |
| 19/76/5 | 95.9 | 694.5 | 1.422 | 1.626 | 131 |
| 18/77/5 | 95.0 | 681.6 | 1.422 | 1.644 | 125 |
| 17/78/5 | 94.2 | 668.6 | 1.422 | 1.656 | 118 |
| 16/79/5 | 93.3 | 655.5 | 1.421 | 1.674 | 111 |
| 15/80/5 | 92.4 | 642.4 | 1.421 | 1.686 | 105 |
| 21.5/73.5/5 | 98.0 | 726.7 | 1.424 | 1.596 | 148 |
| 21/74/5 | 97.6 | 720.3 | 1.423 | 1.602 | 145 |
| 20.5/74.5/5 | 97.2 | 713.9 | 1.423 | 1.608 | 142 |
| 21.5/73.6/4.9 | 98.1 | 726.6 | 1.424 | 1.596 | 148 |
| 21.5/73.7/4.8 | 98.1 | 726.5 | 1.424 | 1.596 | 148 |
| 21.5/73.8/4.7 | 98.1 | 726.5 | 1.424 | 1.596 | 148 |
| 21.5/73.9/4.6 | 98.1 | 726.4 | 1.424 | 1.596 | 148 |
| 21.5/74.0/4.5 | 98.2 | 726.3 | 1.424 | 1.596 | 148 |
| 21.5/74.1/4.4 | 98.2 | 726.3 | 1.424 | 1.596 | 148 |
| 21.5/74.2/4.3 | 98.2 | 726.2 | 1.424 | 1.602 | 148 |
| 21.5/74.3/4.2 | 98.2 | 726.1 | 1.424 | 1.602 | 148 |
| 21.5/74.4/4.1 | 98.3 | 726.1 | 1.425 | 1.602 | 148 |
| 21.5/74.5/4.0 | 98.3 | 726 | 1.425 | 1.602 | 148 |

| Blend (weight %) | Δ $T_{DIS}$ Rel. to R-457A (° C.) | Capacity Rel. to R-457A (%) | COP Rel. to R-457A (%) |
|---|---|---|---|
| 18/72/10 | −7.8 | 102.5 | 96.9 |
| 18/73/9 | −7.7 | 102.6 | 96.9 |
| 18/74/8 | −7.5 | 102.6 | 96.9 |
| 18/75/7 | −7.3 | 102.6 | 96.9 |
| 18/76/6 | −7.1 | 102.6 | 97.0 |
| 18/77/5 | −7.0 | 102.5 | 97.1 |
| 18/78/4 | −6.7 | 102.4 | 97.1 |
| 18/79/3 | −6.5 | 102.3 | 97.2 |
| 18/80/2 | −6.3 | 102.1 | 97.3 |
| 18/81/1 | −6.1 | 101.9 | 97.4 |
| 20/75/5 | −5.3 | 106.4 | 97.1 |
| 19/76/5 | −6.1 | 104.5 | 97.1 |
| 18/77/5 | −7.0 | 102.5 | 97.1 |
| 17/78/5 | −7.8 | 100.6 | 97.1 |
| 16/79/5 | −8.7 | 98.6 | 97.0 |
| 15/80/5 | −9.6 | 96.6 | 97.0 |
| 21.5/73.5/5 | −3.9 | 109.3 | 97.2 |
| 21/74/5 | −4.4 | 108.3 | 97.1 |
| 20.5/74.5/5 | −4.8 | 107.4 | 97.1 |
| 21.5/73.6/4.9 | −3.9 | 109.3 | 97.2 |
| 21.5/73.7/4.8 | −3.9 | 109.3 | 97.2 |
| 21.5/73.8/4.7 | −3.9 | 109.3 | 97.2 |
| 21.5/73.9/4.6 | −3.8 | 109.2 | 97.2 |
| 21.5/74.0/4.5 | −3.8 | 109.2 | 97.2 |
| 21.5/74.1/4.4 | −3.8 | 109.2 | 97.2 |
| 21.5/74.2/4.3 | −3.8 | 109.2 | 97.2 |
| 21.5/74.3/4.2 | −3.8 | 109.2 | 97.2 |
| 21.5/74.4/4.1 | −3.7 | 109.2 | 97.3 |
| 21.5/74.5/4.0 | −3.7 | 109.2 | 97.3 |

TABLE 4

R-32/R-1234YF/R-600A COMPOSITIONS -
MEDIUM TEMPERATURE REFRIGERATION
(40° C. Avg. Condenser, −7° C. Avg. Evaporator, 18° C.
Return gas temperature, 0.7 Compressor Efficiency, 0.1 m³/min
Compressor Displacement, 1 Ton of refrigeration)

| R-32/R-1234yf/R-600a (weight %) | $T_{DIS}$ (° C.) | Capacity (kJ/m³) | COP | Mass Flow (kg/min) | GWP 100 Year (AR4) |
|---|---|---|---|---|---|
| 18/72/10 | 82.2 | 2311.3 | 2.999 | 1.332 | 125 |
| 18/73/9 | 82.3 | 2314.2 | 2.999 | 1.344 | 125 |
| 18/74/8 | 82.4 | 2316.3 | 2.999 | 1.350 | 125 |
| 18/75/7 | 82.5 | 2317.8 | 2.999 | 1.362 | 125 |
| 18/76/6 | 82.6 | 2318.6 | 2.999 | 1.368 | 125 |
| 18/77/5 | 82.7 | 2318.8 | 3.000 | 1.380 | 125 |
| 18/78/4 | 82.8 | 2318.3 | 3.001 | 1.386 | 125 |
| 18/79/3 | 82.9 | 2317.1 | 3.002 | 1.392 | 125 |
| 18/80/2 | 83.0 | 2315.2 | 3.004 | 1.404 | 125 |
| 18/81/1 | 83.2 | 2312.6 | 3.006 | 1.410 | 125 |
| 20/75/5 | 83.7 | 2388.0 | 2.995 | 1.362 | 138 |
| 19/76/5 | 83.2 | 2353.7 | 2.997 | 1.368 | 131 |
| 18/77/5 | 82.7 | 2318.8 | 3.000 | 1.380 | 125 |
| 17/78/5 | 82.2 | 2283.3 | 3.002 | 1.386 | 118 |
| 16/79/5 | 81.7 | 2247.2 | 3.005 | 1.398 | 111 |
| 15/80/5 | 81.2 | 2210.4 | 3.007 | 1.404 | 105 |
| 21.5/73.5/5 | 84.4 | 2438.5 | 2.99 | 1.344 | 148 |
| 21/74/5 | 84.2 | 2421.8 | 2.992 | 1.35 | 145 |
| 20.5/74.5/5 | 83.9 | 2405 | 2.993 | 1.356 | 142 |
| 21.5/73.6/4.9 | 84.4 | 2438.4 | 2.99 | 1.344 | 148 |
| 21.5/73.7/4.8 | 84.4 | 2438.4 | 2.991 | 1.35 | 148 |
| 21.5/73.8/4.7 | 84.4 | 2438.4 | 2.991 | 1.35 | 148 |
| 21.5/73.9/4.6 | 84.5 | 2438.4 | 2.991 | 1.35 | 148 |
| 21.5/74.0/4.5 | 84.5 | 2438.3 | 2.991 | 1.35 | 148 |

TABLE 4-continued

R-32/R-1234YF/R-600A COMPOSITIONS -
MEDIUM TEMPERATURE REFRIGERATION
(40° C. Avg. Condenser, −7° C. Avg. Evaporator, 18° C.
Return gas temperature, 0.7 Compressor Efficiency, 0.1 m³/min
Compressor Displacement, 1 Ton of refrigeration)

| | | | | | |
|---|---|---|---|---|---|
| 21.5/74.1/4.4 | 84.5 | 2438.3 | 2.991 | 1.35 | 148 |
| 21.5/74.2/4.3 | 84.5 | 2438.2 | 2.991 | 1.35 | 148 |
| 21.5/74.3/4.2 | 84.5 | 2438.2 | 2.991 | 1.35 | 148 |
| 21.5/74.4/4.1 | 84.5 | 2438.1 | 2.991 | 1.35 | 148 |

| R-32/R-1234yf/R-600a (weight %) | Δ $T_{DIS}$ Rel. to R-457A (° C.) | Capacity Rel. to R-457A (%) | COP Rel. to R-457A (%) |
|---|---|---|---|
| 18/72/10 | −4.3 | 102.8 | 98.5 |
| 18/73/9 | −4.2 | 103.0 | 98.5 |
| 18/74/8 | −4.1 | 103.1 | 98.5 |
| 18/75/7 | −4.0 | 103.1 | 98.5 |
| 18/76/6 | −3.9 | 103.2 | 98.5 |
| 18/77/5 | −3.8 | 103.2 | 98.5 |
| 18/78/4 | −3.7 | 103.1 | 98.6 |
| 18/79/3 | −3.6 | 103.1 | 98.6 |
| 18/80/2 | −3.5 | 103.0 | 98.7 |
| 18/81/1 | −3.3 | 102.9 | 98.7 |
| 20/75/5 | −2.8 | 106.2 | 98.4 |
| 19/76/5 | −3.3 | 104.7 | 98.4 |
| 18/77/5 | −3.8 | 103.2 | 98.5 |
| 17/78/5 | −4.3 | 101.6 | 98.6 |
| 16/79/5 | −4.8 | 100.0 | 98.7 |
| 15/80/5 | −5.3 | 98.3 | 98.8 |
| 21.5/73.5/5 | −2.1 | 108.5 | 98.2 |
| 21/74/5 | −2.3 | 107.8 | 98.3 |
| 20.5/74.5/5 | −2.6 | 107.0 | 98.3 |
| 21.5/73.6/4.9 | −2.1 | 108.5 | 98.2 |
| 21.5/73.7/4.8 | −2.1 | 108.5 | 98.2 |
| 21.5/73.8/4.7 | −2.1 | 108.5 | 98.2 |
| 21.5/73.9/4.6 | −2.1 | 108.5 | 98.2 |
| 21.5/74.0/4.5 | −2.0 | 108.5 | 98.2 |
| 21.5/74.1/4.4 | −2.0 | 108.5 | 98.2 |
| 21.5/74.2/4.3 | −2.0 | 108.5 | 98.2 |
| 21.5/74.3/4.2 | −2.0 | 108.5 | 98.2 |
| 21.5/74.4/4.1 | −2.0 | 108.5 | 98.2 |
| 21.5/74.5/4.0 | −2.0 | 108.5 | 98.2 |

Results show compositions of the present invention exhibit compressor discharge temperatures lower than R-454C and R-457A. They also have capacities and energy efficiency (COP) comparable to or higher than the incumbent refrigerants, and R-457A in particular.

Example 2

Flammability Classification: Vapor Leak Analysis and Flammability Testing

Certain compositions of the present invention were evaluated under vapor leak conditions as described under ASHRAE Standard 34-2019 "Designation and Safety Classification of Refrigerants" to determine if requirements could be met for ASHRAE Class 2L, Lower Flammability or Class 2, Flammable. Per the standard, nominal formulations are developed and then assigned representative manufacturing tolerances as exact formulations are not made in commercial practice. Manufacturing tolerances selected for this analysis are as follows: either R-32 at ±2 wt %, R-1234yf±2 wt %, and R-600a at +0/−0.5 wt %, or R-32 at ±1 wt %, R-1234yf±1 wt %, and R-600a at +0/−0.5 wt %. The Worst Case of Formulation for Flammability (WCF) is selected, which in these cases represents the formulation that could produce the highest burning velocity ($S_u$) based on manufacturing tolerances. The WCF is then modeled for vapor leakage of the refrigerant using NIST RefLeak 6.0 at worst case conditions for several ASHRAE Standard 34 leak scenarios to determine the Worst Case of Fractionation for Flammability (WCFF), where the highest concentration of higher burning velocity components (R-600a and R-32) are observed in either the refrigerant liquid or vapor phase. For the compositions of the present invention, the WCFF was determined to occur during the "Leaks Under Storage/Shipping" conditions. The WCFFs were found to be in the vapor phase at the bubble point temperature+10° C., when the cylinder is filled to 90% full at a temperature of 54.4° C., and when the pressure in the cylinder approached atmospheric pressure. The WCFF compositions are then tested using a vertical tube burning velocity apparatus. Compositions that produced burning velocities≤10 cm/s are expected to fall in the A2L safety group, while those >10 cm/s are expected to fall into the A2 safety group. Results are shown Table 5.

TABLE 5

FLAMMABILITY RESULTS

| Composition | Weight % | Composition Type | WCFF Burning Velocity (cm/s) | Expected Safety Group |
|---|---|---|---|---|
| R-32/1234yf/R600a | 16/79/5 | Nominal | >10 | A2 |
| | 18/77/5 | WCF | | |
| | 16.34/78.27/5.39 | WCFF | | |
| R-32/1234yf/R600a | 21.5/74/4.5 | Nominal | >10 | A2 |
| | 23.5/72/4.5 | WCF | | |
| | 48.23/46.88/4.89 | WCFF | | |
| R-32/1234yf/R600a | 17/79.5/3.5 | Nominal | >10 | A2 |
| | 19/77.5/3.5 | WCF | | |
| | 43.60/52.52/3.88 | WCFF | | |
| R-32/1234yf/600a | 21.5/75.5/3.0 | Nominal | ≤10 | A2L |
| | 23.5/75.5/3.0 | WCF | | |
| | 47.96/48.58/3.46 | WCFF | | |
| R-32/1234yf/600a | 18/78.7/3.3 | Nominal | ≤10 | A2L |
| | 19/77.7/3.3 | WCF | | |
| | 43.58/52.73/3.69 | WCFF | | |

While the invention has been described with reference to a preferred embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

ADDITIONAL EMBODIMENTS

Embodiment A1: A composition comprising a refrigerant consisting essentially of from about 15 to 22 weight percent difluoromethane, from about 70 to 84 weight percent 2,3,3,3-tetrafluoropropene, and from about 1.0 to 10 weight percent isobutane.

Embodiment A2: The composition of Embodiment A1, wherein the refrigerant consists essentially of from about 15 to 21.5 weight percent difluoromethane, from about 70 to 84 weight percent 2,3,3,3-tetrafluoropropene, and from about 1.0 to 10 weight percent isobutane.

Embodiment A3: The composition of Embodiment A1 or A2, wherein the refrigerant consists essentially of from about 15 to 21 weight percent difluoromethane, from about 70 to 84 weight percent 2,3,3,3-tetrafluoropropene, and from about 1.0 to 10 weight percent isobutane.

Embodiment A4: The composition of any of Embodiments A1 to A3, wherein the refrigerant consists essentially of from about 15 to 20 weight percent difluoromethane, from about 70 to 84 weight percent 2,3,3,3-tetrafluoropropene, and from about 1.0 to 10 weight percent isobutane.

Embodiment A5: The composition of any of Embodiments A1 or A4, wherein the refrigerant comprises from about 15 to 19 weight percent difluoromethane, from about 76 to 84 weight percent 2,3,3,3-tetrafluoropropene, and from about 1.0 to 6.0 weight percent isobutane.

Embodiment A6: The composition of any of Embodiments A1 or A5, wherein the refrigerant consists essentially of from about 18 to 21.5 weight percent difluoromethane, from about 76 to 84 weight percent 2,3,3,3-tetrafluoropropene, and from about 1.0 to 5.0 weight percent isobutane.

Embodiment A7: The composition of any of Embodiments A1 to A5, wherein the refrigerant consists essentially of from about 17 to 18 weight percent difluoromethane, from about 78 to 81 weight percent 2,3,3,3-tetrafluoropropene, and from about 1.0 to 4.0 weight percent isobutane.

Embodiment A8: The composition of any of Embodiments A1 to A7, wherein the isobutane is present in an amount of 3.0 to 5.0 weight percent based on the weight of the refrigerant composition.

Embodiment A9: The composition of any of Embodiments A1 to A8, wherein the isobutane is present in an amount of 4.0 to 5.0 weight percent based on the weight of the refrigerant composition.

Embodiment A10: The composition of any of Embodiments A1 to A9, wherein the refrigerant composition consists essentially of from about 20 to 22 weight percent difluoromethane, about 73 to about 76 weight percent 2,3,3,3-tetrafluoropropene, and about 4.0 to 5.0 weight percent isobutane.

Embodiment A11: The composition of any of Embodiments A1 to A10, wherein the refrigerant composition consists essentially of about 21.5 weight percent difluoromethane, about 73 to about 75 weight percent 2,3,3,3-tetrafluoropropene, and about 4.0 to 5.0 weight percent isobutane.

Embodiment A12: The composition of any of Embodiments A1 to A11, wherein the difluoromethane (R-32) is present in an amount of 18 weight percent based on the weight of the refrigerant composition, the 2,3,3,3-tetrafluoropropene (R-1234yf) is present in an amount of 80 weight percent based on the weight of the refrigerant composition, and the isobutane is present in an amount of 2.0 weight percent based on the weight of the refrigerant composition.

Embodiment A13: The composition of any of Embodiments A1 to A11, wherein the difluoromethane (R-32) is present in an amount of 17 weight percent based on the weight of the refrigerant composition, the 2,3,3,3-tetrafluoropropene (R-1234yf) is present in an amount of 81 weight percent based on the weight of the refrigerant composition, and the isobutane is present in an amount of 2.0 weight percent based on the weight of the refrigerant composition.

Embodiment A14: The composition of any of Embodiments A1 to A13, further comprising a non-refrigerant compound in an amount of 0.01 to 49 weight percent based on the weight of the refrigerant composition.

Embodiment A15: The composition of any of Embodiments A1 to A14, wherein the non-refrigerant compound includes a lubricant selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

Embodiment A16: The composition of any of Embodiments A1 to A15, wherein the non-refrigerant compound includes at least one selected from the group consisting of dyes (including UV dyes), solubilizing agents, compatibilizers, stabilizers, tracers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

Embodiment A17: The composition of any of Embodiments A1 to A16, wherein the non-refrigerant compound includes at least one stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof.

Embodiment A18: The composition of any of Embodiments A1 to A17, wherein the refrigerant composition has flame propagation less than 10 cm/s.

Embodiment A19: The composition of any of Embodiments A1 to A18, wherein the refrigerant would be classified by ASHRAE as 2L flammability.

Embodiment A20: The composition of any of Embodiments A1 to A19, wherein the isobutane is present in an amount from about 2.0 to 3.3 weight percent.

Embodiment B1: A refrigeration system, comprising:
a hermetic compressor;
and a refrigerant composition;
wherein the refrigerant composition comprises the composition of any of Embodiments A1 to A20.

Embodiment B2: The refrigeration system of Embodiment B1, wherein said hermetic compressor is a rotary, scroll, or reciprocating compressor.

Embodiment B3: The refrigeration system of Embodiment B1 or B2, wherein said hermetic compressor is a low back pressure (LBP) or medium back pressure (MBP) hermetic compressor.

Embodiment B4: The refrigeration system of any of Embodiment B1 to B3, wherein said hermetic compressor is a low back pressure (LBP) reciprocating compressor.

Embodiment B5: The refrigeration system of any of embodiments B1 to B4, further comprising an evaporator wherein the average evaporator temperature is below −5° C.

Embodiment B6: The refrigeration system of any of Embodiments B1 to B5, wherein the compressor discharge temperature is below the compressor discharge temperature of R-457A.

Embodiment B7: The refrigeration system of any of Embodiments B1 to B5, wherein the compressor discharge temperature is below the compressor discharge temperature of R-454C.

Embodiment C1: A method of replacing a first refrigerant composition comprising R-404A, R-457A, R-290, or R-454C with a second refrigerant composition comprising a composition of any of Embodiments A1 to A20, wherein the replacing is performed in a refrigeration system isobutane including a hermetic compressor.

Embodiment C2: The method of Embodiment C1, wherein said hermetic compressor is a rotary, scroll or reciprocating compressor.

Embodiment C3: The method of Embodiment C1 or C2, wherein said hermetic compressor is a low back pressure (LBP) or medium back pressure (MBP) hermetic compressor.

Embodiment C4: The method of any of Embodiments C1 to C3, wherein said hermetic compressor is a low back pressure (LBP) reciprocating compressor.

Embodiment C5: The method of any of Embodiments C1 to C4, wherein the compressor discharge temperature is below the compressor discharge temperature of R-457A.

Embodiment C6: The method of any of Embodiments C1 to C4, wherein the compressor discharge temperature is below the compressor discharge temperature of R-454C.

Embodiment D1: A method of operating a hermetic compressor as part of a refrigeration system, comprising the steps of:
receiving by a hermetic compressor a refrigerant composition including any of the compositions of Embodiments A1 to A20;
compressing by a hermetic compressor the refrigerant composition; wherein the discharge temperature of the compressor is between 80.0° C. and 100.0° C.

Embodiment D2: The method of Embodiment D1, wherein said hermetic compressor is a rotary, scroll, or reciprocating compressor.

Embodiment D3: The method of any of Embodiments D1 or D2, wherein said hermetic compressor is a low back pressure (LBP) or medium back pressure (MBP) hermetic compressor.

Embodiment D4: The method of any of Embodiments D1 to D3, wherein said hermetic compressor is a low back pressure (LBP) reciprocating compressor.

Embodiment D5: The method of any of Embodiments D1 to D4, wherein the hermetic compressor receives the refrigerant composition from an evaporator having an average evaporator temperature between −40° C. and −5° C.

Embodiment D6: The method of any of the Embodiments of D1 to D5, wherein the hermetic compressor receives the refrigerant composition from an evaporator having an average evaporator temperature between −40° C. and −18° C.

Embodiment D7: The method of any of the Embodiments of D1 to D6, wherein the hermetic compressor receives the refrigerant composition from an evaporator having an average evaporator temperature between −20° C. and −5° C.

What is claimed is:

1. A composition comprising a refrigerant consisting essentially of 15 to 22 weight percent difluoromethane, 70 to 84 weight percent 2,3,3,3-tetrafluoropropene, and 1.0 to 10 weight percent isobutane.

2. The composition of claim 1, wherein the refrigerant consists essentially of 15 to 19 weight percent difluoromethane, 76 to 84 weight percent 2,3,3,3-tetrafluoropropene, and 1.0 to 6.0 weight percent isobutane.

3. The composition of claim 1, wherein the refrigerant consists essentially of 20 to 22 weight percent difluoromethane, 73 to 76 weight percent 2,3,3,3-tetrafluoropropene, and 4.0 to 5.0 weight percent isobutane.

4. The composition of claim 1, further comprising a non-refrigerant compound in an amount of 0.01 to 49 weight percent based on the weight of the refrigerant composition.

5. The composition of claim 4, wherein the non-refrigerant compound includes a lubricant selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

6. A refrigeration system, comprising:
a hermetic compressor;
and the composition of claim 1.

7. The refrigeration system of claim 6, wherein said hermetic compressor is a rotary, scroll, or reciprocating compressor.

8. The refrigeration system of claim 6, further comprising a non-refrigerant compound in an amount of 0.01 to 49 weight percent based on the weight of the refrigerant composition.

9. The refrigeration system of claim 8, wherein the non-refrigerant compound includes a lubricant selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

10. The refrigeration system of claim 6:
wherein the compressor discharge temperature is below the compressor discharge temperature of R-457A or R-454C.

11. A method of operating a hermetic compressor as part of a refrigeration system, comprising the steps of:
receiving by the hermetic compressor the composition of claim 1;
compressing by the hermetic compressor the composition;
wherein the discharge temperature of the hermetic compressor is between 80.0° C. and 100.0° C.

12. The method of claim 11, wherein the hermetic compressor is a low back pressure hermetic reciprocating compressor and the low back pressure hermetic reciprocating compressor receives the composition of claim 1 from an evaporator having an average evaporator temperature between −40° C. and −5° C.

13. The method of claim 11, wherein the discharge temperature of the compressor is between 81.0° C. and 99.0° C.

14. The method of claim 11, wherein:
the hermetic compressor is a low back pressure hermetic reciprocating compressor; and
the method further comprises a step of receiving by the low back pressure hermetic reciprocating compressor the refrigerant composition from an evaporator;
wherein the average evaporator temperature is below −5° C.

15. A method of replacing a first refrigerant composition comprising R-404A, R-457A, R-290, or R-454C with a second refrigerant composition comprising 70 to 84 weight percent 2,3,3,3-tetrafluoropropene, 15 to 22 weight percent difluoromethane, and 1.0 to 10 weight percent isobutane, wherein the replacing is performed in a refrigeration system including a hermetic compressor.

16. The method of claim 15, wherein the second refrigerant composition further comprises a non-refrigerant compound in an amount of 0.01 to 50 weight percent based on the weight of the refrigerant composition.

17. The method of claim 16, wherein the non-refrigerant compound includes a lubricant selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

18. The method of claim 15, wherein the compressor discharge temperature is below the compressor discharge temperature of R-457A.

* * * * *